US012627074B2

(12) United States Patent
Gonzalez et al.

(10) Patent No.: US 12,627,074 B2
(45) Date of Patent: May 12, 2026

(54) ANTENNA DEVICE, AND BASE STATION WITH ANTENNA DEVICE

(71) Applicant: HUAWEI TECHNOLOGIES CO., LTD., Shenzhen (CN)

(72) Inventors: Ignacio Gonzalez, Munich (DE); Bruno Biscontini, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 135 days.

(21) Appl. No.: 18/156,640

(22) Filed: Jan. 19, 2023

(65) Prior Publication Data

US 2023/0155300 A1 May 18, 2023

Related U.S. Application Data

(63) Continuation of application No. PCT/EP2020/070449, filed on Jul. 20, 2020.

(51) Int. Cl.
*H01Q 21/00* (2006.01)
*H01Q 21/08* (2006.01)

(52) U.S. Cl.
CPC ......... *H01Q 21/08* (2013.01); *H01Q 21/0006* (2013.01)

(58) Field of Classification Search
CPC ...... H01Q 21/08; H01Q 21/0006; H01Q 5/48; H01Q 21/26; H01Q 1/521; H01Q 1/246
See application file for complete search history.

(56) References Cited

U.S. PATENT DOCUMENTS

| | | | | |
|---|---|---|---|---|
| 6,307,524 | B1 | 10/2001 | Britain | |
| 2005/0225498 | A1 | 10/2005 | Koparan et al. | |
| 2006/0164317 | A1 | 7/2006 | Hughes | |
| 2009/0224995 | A1* | 9/2009 | Puente | H01Q 1/42 343/893 |
| 2013/0106667 | A1 | 5/2013 | Fenn et al. | |
| 2017/0365908 | A1* | 12/2017 | Hughes | H01Q 1/246 |
| 2019/0115672 | A1* | 4/2019 | Zimmerman | H01Q 21/08 |
| 2019/0348768 | A1* | 11/2019 | Behdad | H01Q 15/248 |
| 2019/0393729 | A1* | 12/2019 | Contopanagos | H01Q 25/007 |

(Continued)

FOREIGN PATENT DOCUMENTS

| | | | |
|---|---|---|---|
| CN | 108028462 | A | 5/2018 |
| CN | 109066086 | A | 12/2018 |

OTHER PUBLICATIONS

R. Bayderkhani et al., Wideband and Low Sidelobe Linear Series Fed Yagi-Like Antenna Array. Progress In Electromagnetics Research B, vol. 17, 153-167, 2009.

(Continued)

*Primary Examiner* — Dameon E Levi
*Assistant Examiner* — Michael M Bouizza
(74) *Attorney, Agent, or Firm* — HAUPTMAN HAM, LLP

(57) ABSTRACT

An antenna device comprising an antenna array for transmitting a signal. The antenna array includes a plurality of radiating elements with each radiating element configured to radiate the signal with a predetermined phase. The antenna device further including another radiating element that is not part of the antenna array. The phase of the signal for each radiating element of the antenna array is controlled such that the signals radiated by the radiating elements of the array interfere destructively at at least part of the other radiating element.

20 Claims, 8 Drawing Sheets

(56) References Cited

U.S. PATENT DOCUMENTS

| | | | | |
|---|---|---|---|---|
| 2020/0099134 | A1* | 3/2020 | Rodríguez | H01Q 1/50 |
| 2021/0305718 | A1* | 9/2021 | Li | H01Q 5/48 |

OTHER PUBLICATIONS

Huan Meng et al., An LC Decoupling Network for Two Antennas Working at Low Frequencies. IEEE Transactions on Microwave Theory and Techniques, vol. 65, No. 7, Jul. 2017, 9 pages.

Fan Yang et al., Microstrip Antennas Integrated With Electromagnetic Band-Gap (EBG) Structures: A Low Mutual Coupling Design for Array Applications. IEEE Transactions on Antennas and Propagation, vol. 51, No. 10, Oct. 2003, 11 pages.

Kin Mi Yang et al., Reduction of Mutual Coupling Between Closely Packed Patch Antennas Using Waveguided Metamaterials. IEEE Antennas and Wireless Propagation Letters, vol. 11, 2012, 3 pages.

Kevin Buell et al., Metamaterial Insulator Enabled Superdirective Array. IEEE Transactions on Antennas and Propagation, vol. 55, No. 4, Apr. 2007, 12 pages.

Lap K. Yeung et al., Mode-Based Beamforming Arrays for Miniaturized Platforms. IEEE Transactions on Microwave Theory and Techniques, vol. 57, No. 1, Jan. 2009, 8 pages.

Navjot Kaur et al., Performance Comparison of MIMO Systems over AWGN and Rician Channels with Zero Forcing Receivers. International Journal of Wireless and Mobile Networks (IJWMN) vol. 5, No. 1, Feb. 2013, 12 pages.

International Search Report issued in corresponding International Application No. PCT/EP2020/070449, dated Mar. 26, 2021, pp. 1-29.

India Office Action issued in corresponding India Application No. 202317004558, dated Jun. 20, 2024, pp. 1-7.

* cited by examiner

ANTENNA DEVICE, AND BASE STATION WITH ANTENNA DEVICE

CROSS-REFERENCE TO RELATED APPLICATIONS

This application is a continuation of International Application No. PCT/EP2020/070449, filed on Jul. 20, 2020, the disclosure of which is hereby incorporated by reference in its entirety.

BACKGROUND

The use of wireless terminals is on the rise worldwide, from cell phones, to tablet PCs and personal digital assistants (PDAs), among many other devices that have wireless connectivity capability. This tremendous proliferation of wireless devices with Internet connectivity has posed demands for higher data throughput. In fifth generation (5G) mobile terminals, MIMO (multiple-input-multiple-output) technology is a major enabling technology for such increase in data throughput using multiple antenna elements on the mobile device, as well as at the base-station. One of the key technologies to enable the new generation of mobile communications is mMIMO (massive MIMO) below 6 GHz.

Although mMIMO antenna systems will be key in 5G standards, the regulations in some countries are a limiting factor. For instance, some proposed regulations require that for site acquisition and site upgrades, the dimension of the new antennas should be comparable to legacy products. In addition, to be able to maintain the mechanical support structures at the sites, the wind load of the new antennas should be equivalent to the legacy products. These factors lead to a very strict limitation for width of the antenna. As a result, in response to placing several independent antenna arrays in a small reflector of the antenna, as required for achieving high throughput, coupling is usually high enough to affect the antenna performance. In particular, in response to a dipole being placed in a side-by-side configuration on a small reflector, the horizontal beam width increases and directivity drops, the signal between adjacent arrays becomes more correlated, and thus the antenna array performance degrades. Such a coupling effect also poses a limitation on the antenna miniaturization.

Current approach to tackle high coupling between antenna arrays relies on placing structures that behave as perfect electric conductors (PEC) in between the antenna arrays. In that way, electromagnetic fields are reflected, and the side-by-side antenna arrays does not receive power from each other, thereby improving the isolation. However, this approach has the limitation that by placing the PECs to isolate the antenna arrays, the available aperture for each antenna array is reduced, and consequently the antenna performance suffers. Other existing solutions rely on narrow band circuits to cancel the coupling.

In an example, "Yagi-Uda" antenna, also known as a Yagi antenna, employs end fire antenna arrays which use reflection arrangement to cause a traverse of at least part of the energy of an end fire slow wave array back along the array to increase the effective length of the array and, therefore, cause an increase in antenna gain. In another example, Electromagnetic band-gap (EBG) structure is used that creates a stopband to block electromagnetic waves of certain frequency bands by forming a fine, periodic pattern of small metal patches on dielectric substrates, and thereby reduce the mutual coupling. In yet another example, metamaterial electromagnetic insulators are formed on the antennas by embedding circuit metamaterials operating in a non-propagating spectral region. In still another example, neutralization lines are provided to compensate for the existing electromagnetic coupling through a direct connection via a conductive link. The conductive link acts as a neutralization device by picking up a certain amount of the signal on one antenna and feeding the signal back to the other antenna.

There are one or more drawbacks associated with the existing solutions. Therefore, in light of the foregoing discussion, the aforementioned drawbacks associated with conventional antenna devices are to be overcome.

SUMMARY

In at least one embodiment, an antenna device is provided, and a base station that comprises one or more antenna devices is provided. At least one embodiment seeks to provide a solution to the existing problem of high coupling associated with conventional antenna devices having a plurality of radiating elements. An aim of at least one embodiment is to provide a solution that overcomes at least partially the problems encountered in prior art and provide an improved isolation between the plurality of radiating elements in the antenna device.

The object of at least one embodiment is achieved by the solutions provided in the enclosed independent claims. Advantageous implementations of the at least one embodiment are further defined in the dependent claims.

In an aspect, an antenna device is provided. The antenna device comprises an antenna array for transmitting a signal. The antenna array comprises a plurality of radiating elements each configured to radiate the signal with a predetermined phase. The antenna device further comprises another radiating element that is not part of the antenna array. Herein, the phase of the signal for each radiating element of the antenna array is controlled such that the signals radiated by the radiating elements of the array interfere destructively at, at least, part of the other radiating element.

The antenna device of at least one embodiment provides destructive superposition of the electromagnetic fields from the plurality of radiating elements of the antenna array in the antenna device with more than one collocated source of signal by using multipath environment generated by another radiating element that is not part of the antenna array. Destructive superposition of the electromagnetic files minimizes mutual coupling between the plurality of radiating elements of the antenna array of the antenna device, and thus increases efficiency and performance of the antenna device. Destructive superposition of the electromagnetic fields are able to be further used to miniaturize width of the antenna device with several independent antenna arrays.

In at least one embodiment, the antenna array is an end fire array.

In the antenna device of at least one embodiment, the end fire array arrangement of the antenna array helps to avoid radiation perpendicular to a radiating axis of the radiating elements in the antenna array. Also due to the resulting resonance, the antenna array displays narrower beam and high directivity.

In at least one embodiment, the other radiating element is located on a broadside of the antenna array.

In the antenna device of at least one embodiment, the other radiating element is located on the broadside of the antenna array, i.e. adjacent to the antenna array along a base axis that is perpendicular to a radiating direction of the other radiating element. This allows for destructive superposition of the signals radiated by the radiating elements of the antenna array at the at least part of the other radiating element.

In an implementation form, the plurality of radiating elements are each configured to radiate the signal with a different amplitude, and wherein the amplitude of the signal for each radiating element is determined such that a magnitude of a superposition of the signals is controlled at the at least part of the other radiating element.

In the antenna device of at least one embodiment, with the amplitude of the signal radiated by the plurality of radiating elements being different from each other, however being determined helps to configure the other radiating element to generate signal with amplitude difference in order to cause destructive superposition at the at least part thereof, resulting in controllable magnitude of the signal after superposition, and thereby controlling the coupling effect in the antenna array of the antenna device.

In an implementation form, the amplitude of the signal for each radiating element includes a variation based on the frequency of the signal.

In the antenna device of at least one embodiment, the amplitude of the signal for each radiating element is controlled over corresponding frequency to allow for destructive interference of the signals by each radiating element over different paths at the at least part of the other radiating element. In this way, the coupling effect is reduced for the entire signal bandwidth or a portion of the bandwidth only.

In an implementation form, a distance between the antenna array and the other radiating element is determined such that the signals radiated by the radiating elements of the array interfere destructively at the at least part of the other radiating element.

In an implementation form, the phase of the signal for each radiating element is controlled such that the signals radiated by the radiating elements of the array interfere destructively at an input port of the other radiating element.

In the antenna device of at least one embodiment, the distance between the antenna array and the other radiating element, with the other radiating element, is determined such that the signal radiated by each radiating element of the antenna array has the phase and the amplitude at the at least part of the other radiating element that results in destructive superposition thereat, and thus reduce the coupling effect in the antenna array of the antenna device.

In an implementation form, the plurality of radiating elements are spaced apart along a radiating axis that is parallel to a radiating direction of the antenna array.

In the antenna device of at least one embodiment, since maximum power by the antenna array is transmitted in the radiating direction (especially in case of the end fire array antenna), the plurality of radiating elements achieve high gain as well as sharp directivity in a confined space.

In an implementation form, the antenna device comprises another antenna array. The other antenna array comprises a plurality of radiating elements. The plurality of radiating elements of the other antenna array includes said other radiating element.

In the antenna device of at least one embodiment, the said another antenna array with its plurality of radiating elements being the said other radiating elements are positioned/calibrated with respect to the plurality of radiating elements in order to achieve destructive interference of the signals for the plurality of radiating elements of the antenna array at the at least part of the other radiating elements, and thereby helps to reduce the coupling effect in the antenna array of the antenna device.

In an implementation form, the signals radiated by the radiating elements of the antenna array interfere destructively at at least part of each radiating element of the other antenna array.

As discussed above, the said another antenna array with its plurality of radiating elements being the said other radiating elements allows for achieving destructive interference of the signals for the plurality of radiating elements of the antenna array at the at least part of the other radiating elements, and thereby reduces the coupling effect in the antenna array of the antenna device.

In an implementation form, the antenna array and the other antenna array are arranged parallel to each other.

In an implementation form, the other antenna array is configured to radiate in a frequency range that at least partially overlaps with a frequency range of the antenna array.

Since, as discussed, the signals radiated by the radiating elements of the antenna array are able to have variation in the frequencies of the signals, therefore the other radiating elements in the other antenna array radiate respective signals in the frequency range at least partially overlapping with the frequency range of the antenna array in order to achieve destructive interference for signals with different frequencies by the radiating elements of the antenna array at the at least part of the other radiating elements, and thereby helps to reduce the coupling effect in the antenna array of the antenna device.

In an implementation form, the antenna device further comprises a phase change element arranged between one or more of the radiating elements and the other radiating element, wherein, in response to the signal radiated by one or more of the radiating elements passing through the phase change element, the phase change element is configured to introduce a phase adjustment into the signal, and wherein the phase adjustment of the phase change element is determined such that the signals radiated by the radiating elements of the array interfere destructively at the at least part of the other radiating element.

The phase change element by introducing the phase adjustment into the signal modifies the phase of the signal radiated by one or more of the radiating elements to ensure that the signals radiated by the radiating elements of the array interfere destructively at the at least part of the other radiating element, and thereby helps to reduce the coupling effect in the antenna array of the antenna device.

In an implementation form, the antenna device further comprises a processor configured to control the phase of the signal for each radiating element.

The processor determines the phase of the signal to be radiated by the radiating elements of the array and controls each radiating element to radiate a signal as per the respective determined phase to ensure destructive interference at the at least part of the other radiating element, and thereby helps to reduce the coupling effect in the antenna array of the antenna device.

In another aspect, a base station comprising one or more antenna devices is provided.

The base station with the one or antenna devices as discussed above provides the advantages and effects achieved thereby. Each of the one or antenna devices of the base station has reduced mutual coupling due to the signals radiated by the radiating elements (of the antenna array therein) interfering destructively at the at least part of the other radiating element thereof.

All implementation forms discussed hereinabove are able to be combined. All devices, elements, circuitry, units and means described in at least one embodiment are implemented in the software or hardware elements or any kind of combination thereof. All steps which are performed by the various entities described in at least one embodiment as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, a skilled person understands that these methods and functionalities are able to be implemented in respective software or hardware elements, or any kind of combination thereof. Features of at least one embodiment are susceptible to being combined in various combinations without departing from the scope of at least one embodiment as defined by the appended claims.

Additional aspects, advantages, features and objects of at least one embodiment is apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood in response to reading in conjunction with the appended drawings. For the purpose of illustrating at least one embodiment, exemplary constructions of the disclosure are shown in the drawings. However, at least one embodiment is not limited to specific methods and instrumentalities disclosed herein. Moreover, those skilled in the art will understand that the drawings are not to scale. Wherever possible, like elements have been indicated by identical numbers.

Embodiments are described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. In response to a number being non-underlined and accompanied by an associated arrow, the non-underlined number is used to identify a general item at which the arrow is pointing.

DETAILED DESCRIPTION OF EMBODIMENTS

The following detailed description illustrates embodiments and ways in which at least one embodiment is able to be implemented. Although some modes of carrying out at least one embodiment have been disclosed, those skilled in the art would recognize that other embodiments for carrying out or practicing at least one embodiment are also possible.

Figure 1A:
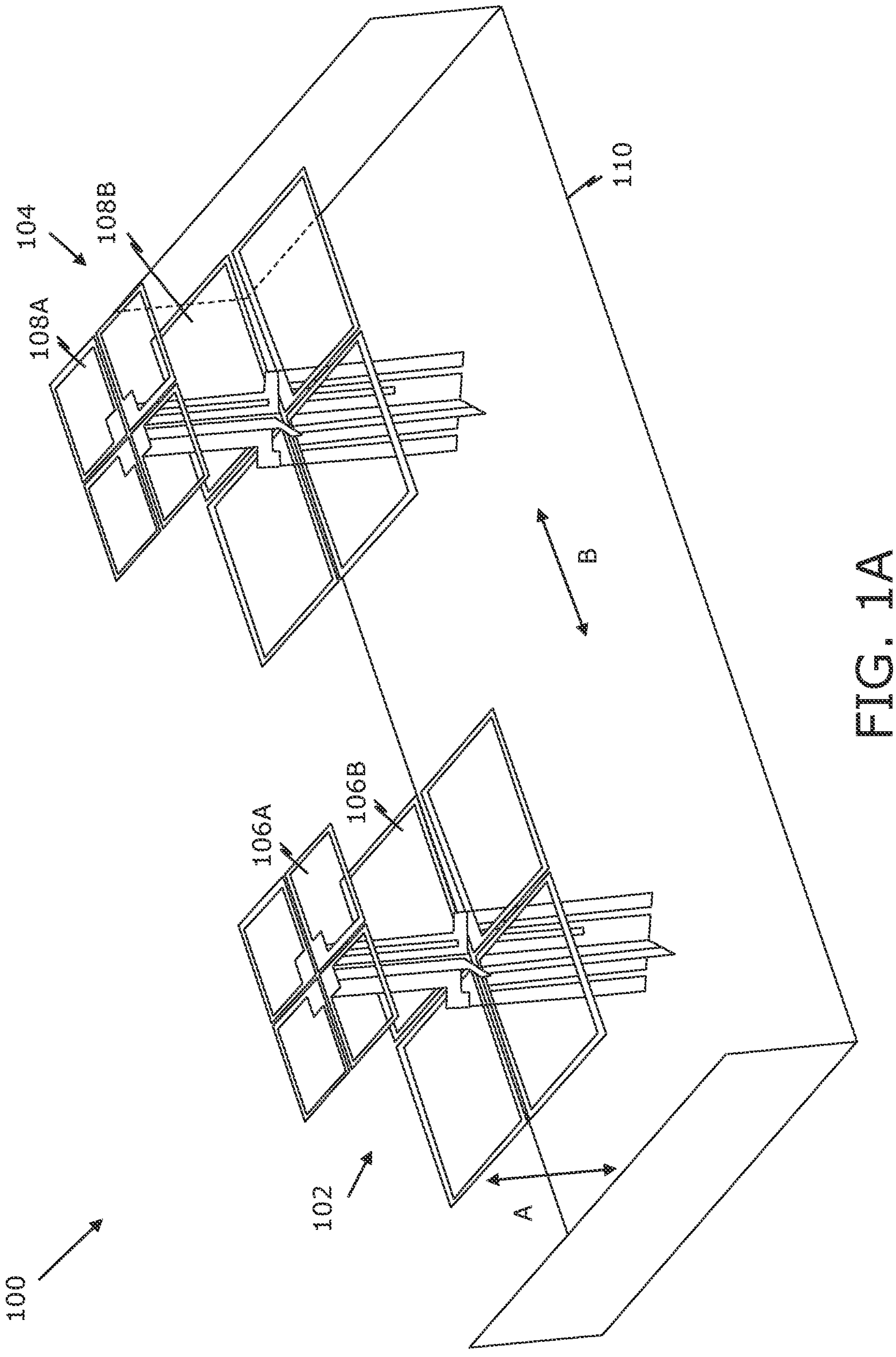
FIG. 1A is a diagrammatic illustration of an antenna device, according to at least one embodiment.

FIG. 1A is a diagrammatic illustration of an antenna device, according to at least one embodiment. With reference to FIG. 1A, there is illustrated an antenna device 100. In at least one embodiment, the antenna device 100 is also referred to as an antenna system, or an antenna element of an antenna. The antenna device 100 of at least one embodiment is used in telecommunication applications. In an example, the antenna device 100 is used in a wireless communication system. Examples of such wireless communication system include, but are not limited to, a base station (such as an Evolved Node B (eNB), a gNB, and the like), a repeater device, a customer premise equipment, and other customized telecommunication hardware.

Figure 1B:
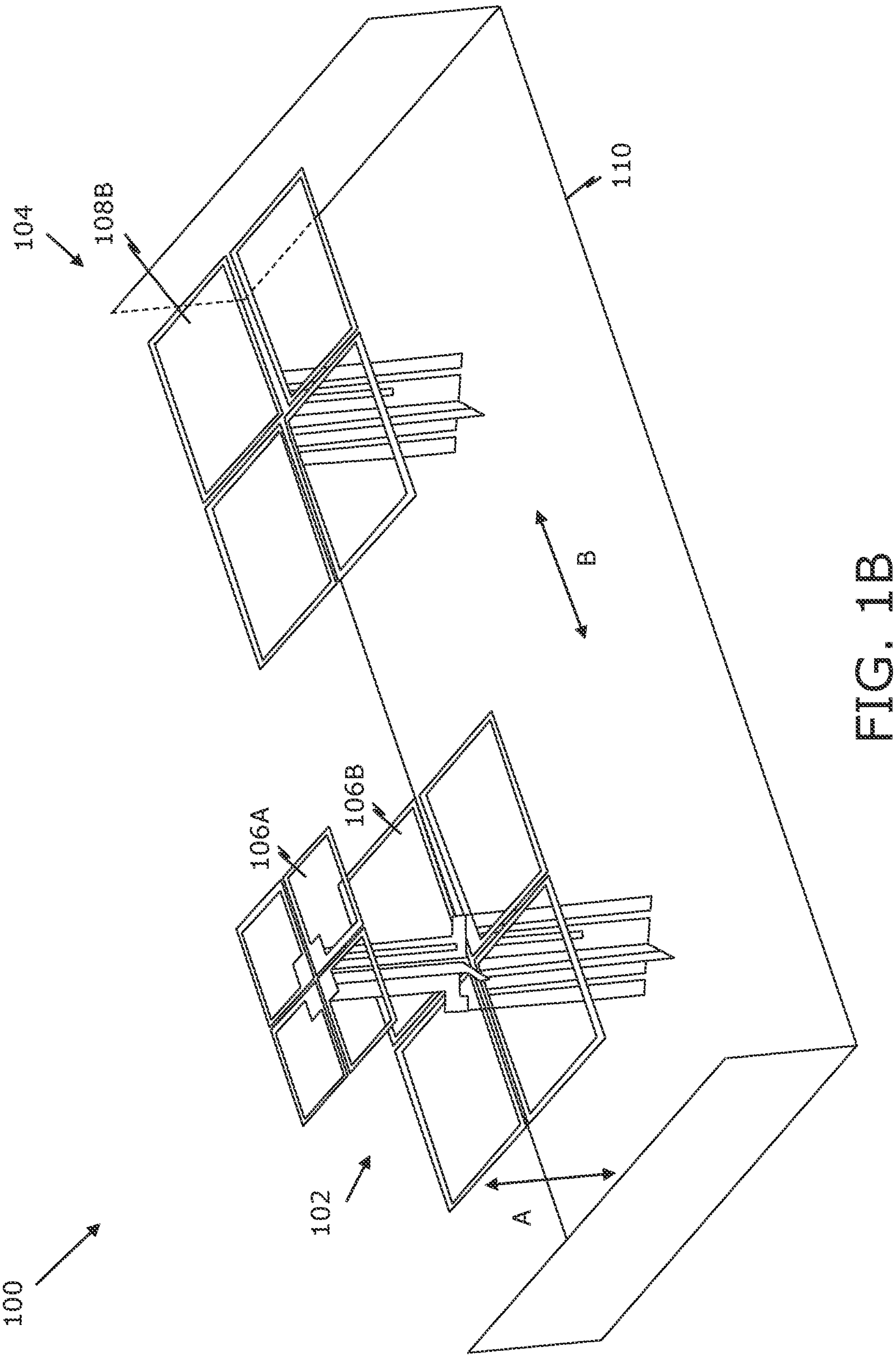
FIG. 1B is a diagrammatic illustration of the antenna device, according to at least one embodiment.

As illustrated in FIG. 1A, the antenna device 100 comprises an antenna array 102. The antenna device 100 further comprises another antenna array 104, also sometimes referred to as another antenna device 104 without any limitations. The antenna array 102 comprises a plurality of radiating elements, namely a first radiating element 106A and a second radiating element 106B. Similarly, the other antenna array 104 comprises another radiating element, or specifically a plurality of other radiating elements, namely a first other radiating element 108A and a second other radiating element 108B. FIG. 1B illustrates the antenna device 100 with the other antenna array 104 including one another radiating element, for instance the second other radiating element 108B, according to at least one embodiment. In the illustrated example, the antenna device 100 also comprises a base 110. The base 110 is arranged to support the antenna array 102 and the other antenna array 104 therein, and is configured to act as an antenna reflector for both the antenna array 102 and the other antenna array 104.

Figure 1C:
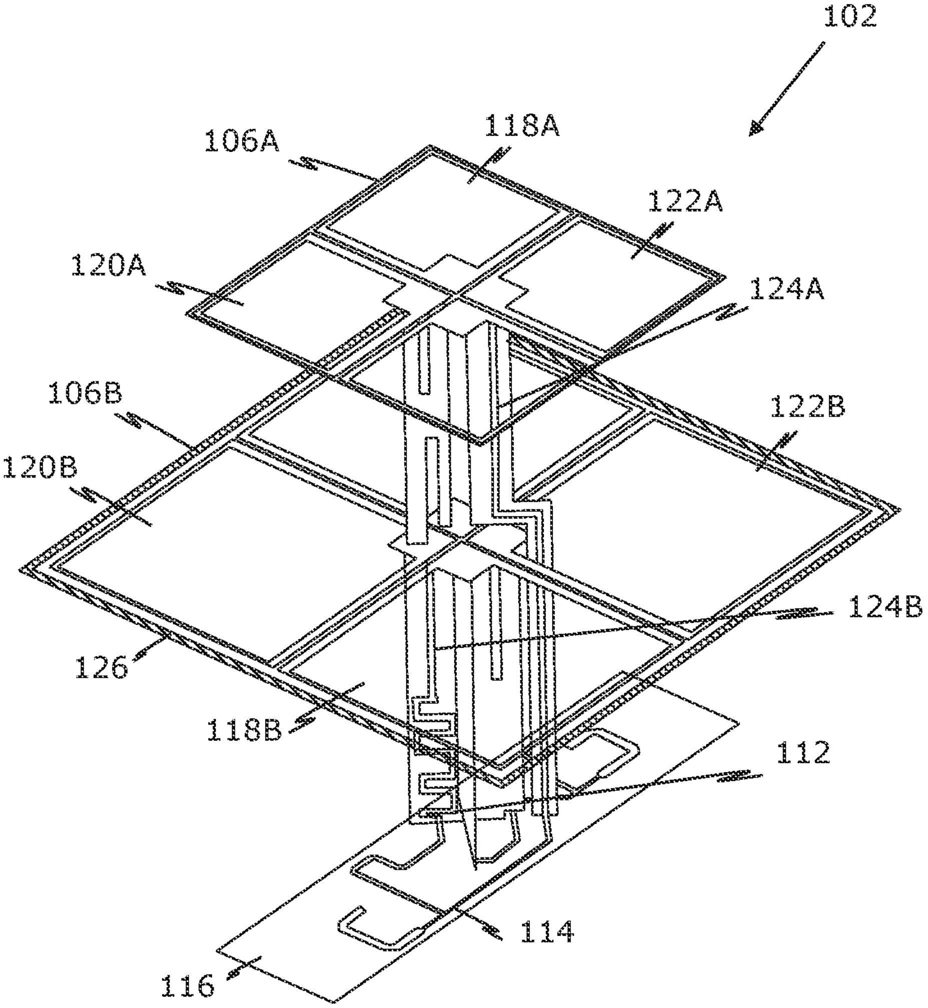
FIG. 1C is a diagrammatic illustration of an antenna array of the antenna device, according to at least one embodiment.

FIG. 1C is a diagrammatic illustration of the antenna array 102, according to at least one embodiment. As illustrated, the antenna array 102 comprises the first radiating element 106A and the second radiating element 106B. The antenna array 102 further comprises a meandered line 112, a power splitter 114 and a printed circuit board (PCB) substrate 116. The first radiating element 106A comprises a first polarization top dipole arm 118A, a second polarization top dipole arm 120A, a printed circuit board (PCB) substrate 122A and a top dipole balun 124A. The second radiating element 106B comprises a first polarization bottom dipole arm 118B, a second polarization bottom dipole arm 120B, a printed circuit board (PCB) substrate 122B and a bottom dipole balun 124B. The second radiating element 106B further comprises a ring 126. Herein, the meandered line 112 are used to control the phase difference between the dipoles. The power splitter 114 is used to control amplitude difference between the dipoles. The printed circuit board (PCB) substrate 116 mechanically supports and electrically connects components of the antenna array 102 using for example, conductive tracks and pads. Components are generally soldered onto the PCB substrate 116 to both electrically connect and mechanically fasten them therewith. Herein, the ring 126 is used for impedance matching and beam width improvement.

Further, the first polarization top dipole arm 118A and the second polarization top dipole arm 120A are two identical conductive elements of equal length that radiate a pattern approximating that of an elementary electric dipole in response to the dipole arm being energized by the current. The printed circuit board (PCB) substrate 122A is similar to the PCB substrate 116 and thus has not been explained herein for the brevity of at least one embodiment. The top dipole balun 124A is used to balance unbalanced power flow from an unbalanced line to a balanced line. For the first polarization top dipole arm 118A and the second polarization top dipole arm 120A, the currents on both arms of the dipole should be equal in magnitude. However, the currents will not necessarily be equal. The top dipole balun 124A forces choking of the current or a current choke and restores balanced operation.

Similarly, the first polarization bottom dipole arm 118B and the second polarization bottom dipole arm 120B are two identical conductive elements of equal length that radiate a pattern approximating that of an elementary electric dipole in response to the dipole arm being energized by the current. The printed circuit board (PCB) substrate 122B is similar to the PCB substrate 116 and thus has not been explained herein for the brevity of at least one embodiment. The bottom dipole balun 124B is used to balance unbalanced power flow from an unbalanced line to a balanced line. For the first polarization bottom dipole arm 118B and the second polarization bottom dipole arm 120B, the currents on both arms of the dipole should be equal in magnitude. However, the currents will not necessarily be equal. The bottom dipole balun 124B forces choking of the current or a current choke and restores balanced operation.

Referring to FIGS. 1A and 1C in combination, the antenna device 100 comprises the antenna array 102 for transmitting a signal. In some examples, the antenna array 102 is also referred to as a radiating device, and the radiating elements 106A, 106B is referred to as antenna elements. The signal transmitted by the antenna array 102 is an electromagnetic wave implemented for wireless telecommunication. Generally, the signal transmitted by the antenna array 102 has a frequency band ranging from 100 Megahertz to 10 Gigahertz. Alternatively, in some embodiments, the signal is an extremely high frequency signal, e.g., in the millimetre wave range. Each of the radiating elements 106A, 106B of the antenna array 102 are collocated to work at the same frequency and are fed independently. Therefore, the antenna array 102 is used in a wireless communication system. Examples of wireless communication system include, but are not limited to, a base station (such as an Evolved Node B (eNB), a gNB, and the like), a repeater device, a customer premise equipment, and other customized telecommunication hardware as known in the art.

The antenna array 102 comprises the plurality of radiating elements 106A, 106B each configured to radiate the signal with a predetermined phase. As discussed, the antenna array 102 comprises the plurality of radiating elements, namely the first radiating element 106A and the second radiating element 106B. The plurality of radiating elements 106A, 106B radiates high directivity electromagnetic signals for wireless telecommunication. Herein, the first radiating element 106A and the second radiating element 106B are arranged adjacent to each other and are electrically connected with each other, to form the antenna array 102. The antenna array 102 comprises at least two radiating elements; however, the antenna array 102 includes any number of radiating elements, such as three radiating elements like a first radiating element, a second radiating element, a third radiating element and so on, depending on the application and configuration of the antenna array 102 without departing from the scope and the spirit of at least one embodiment.

Herein, the phase of the signal represents a particular point in time on the cycle of a waveform of the signal, measured as an angle in degrees, with the period of one cycle of the waveform of the signal is divided to 360 degrees or 2π radians. The term "phase" is meaningful for waves that repeat themselves over time. Each of the first radiating element 106A and the second radiating element 106B radiates the respective signals. The signal radiated by the first radiating element 106A and the signal radiated by the second radiating element 106B are radiated with the determined phase by exciting each of the plurality of radiating elements 106A, 106B differently. Herein, for example, the predetermined phase of the radiated signals is anywhere in a range of 0 degrees to 360 degrees. In such implementation, the predetermined phase is able to be 0, 40, 80, 120, 160, 200, 240, 280, 320 degrees or 360 degrees. In an example, the signal of the first radiating element 106A and the signal of the second radiating element 106B have a difference of phase in between them. For example, the difference of phase between the radiated signals by the first radiating element 106A and the second radiating element 106B is in a range of 0 degrees to 360 degrees. In such implementation, the difference of phase varies from 0, 40, 80, 120, 160, 200, 240, 280 or 320 degrees up to 40, 80, 120, 160, 200, 240, 280, 320 or 360 degrees.

According to an embodiment, the antenna array 102 is an end fire array. The end fire array (also referred as two collocated radiating structures) is a type of array in which the number of identical radiating elements are placed, generally, at equal spacing and are fed with a current source of, generally, equal magnitude, but the phases of the current source vary progressively to achieve a highly unidirectional radiation pattern. The end fire array is also defined as an array in which a direction of maximum radiation coincides with a direction of a radiating axis A of the array. That is, the end fire array provides maximum radiation along the radiating axis A thereof. The end fire array arrangement of the antenna array 102 helps to avoid radiation perpendicular to the radiating axis A of the radiating elements 106A, 106B in the antenna array 102; and due to the resulting resonance, the antenna array 102 displays a narrower beam and high directivity.

According to an embodiment, the plurality of radiating elements 106A, 106B are spaced apart along the radiating axis A that is parallel to a radiating direction of the antenna array 102. As discussed, the radiating direction is the direction in which the antenna array 102 radiates maximum signal strength and hence, maximum power. Since the antenna array 102 is an end fire array, maximum power by the antenna array 102 is transmitted along the radiating axis A. Therefore, the plurality of radiating elements 106A, 106B are spaced apart along the radiating axis A. As illustrated in FIG. 1A, in the present examples, the first radiating element 106A is placed above and spaced apart from the second radiating element 106B along the radiating axis A. This helps to achieve high gain as well as sharp directivity in a confined space for the antenna array 102.

The antenna device 100 further comprises another radiating element 108A, 108B that is not part of the antenna array 102. According to an embodiment, the antenna device 100 comprises another antenna array 104, the other antenna array 104 comprising a plurality of radiating elements, the plurality of radiating elements of the other antenna array 104 including said other radiating element 108A, 108B. Herein, the other radiating elements 108A, 108B are part of the other antenna array 104. In some examples, the other antenna array 104 is also referred to as a radiating device, and the other radiating elements 108A, 108B is also referred to as the other antenna element. As discussed, the other antenna array 104 comprises the plurality of other radiating elements, namely the first other radiating element 108A and the second other radiating element 108B. The plurality of radiating elements 108A, 108B radiates high directivity electromagnetic signals. Herein, the first other radiating element 108A and the second other radiating element 108B are arranged adjacent to each other and are electrically connected with each other, to form the other antenna array 104. Similar to the antenna array 102, the signal transmitted by the other antenna array 104 has a frequency band ranging from 100 Megahertz to 10 Gigahertz. Further, similar to the antenna array 102, each of the other radiating elements 108A, 108B of the other antenna array 104 are collocated to work at the same frequency and are fed independently. Other antenna array 104 comprises at least one other radiating element; however, the other antenna array 104 includes any number of other radiating elements, such as three radiating elements like a first other radiating element, a second other radiating element, a third other radiating element and so on, depending on the application and configuration of the other antenna array 104 and the antenna array 102, without departing from the scope and the spirit of at least one embodiment.

According to an embodiment, the signals radiated by the radiating elements 106A, 106B of the antenna array 102 interfere destructively at least part of each radiating element 108A, 108B of the other antenna array 104. Herein, the destructive interference at the at least part of the other radiating elements 108A, 108B of the other antenna array 104 results in reduced magnitude of the signals radiated by the radiating elements 106A, 106B of the antenna array 102 after superposition, thus reducing the mutual coupling between the radiating elements 106A, 106B of the antenna array 102.

In the antenna device 100, the phase of the signal for each radiating element 106A, 106B of the antenna array 102 is controlled such that the signals radiated by the radiating elements 106A, 106B of the array 102 interfere destructively at at least part of the other radiating element 108A, 108B. The phase of each signal of the first radiating element 106A and of the second radiating element 106B is determined such that the other radiating element 108A, 108B is positioned/calibrated to cause the signal of the first radiating element 106A and the signal of the second radiating element 106B to interfere destructively at the at least part of the other radiating elements 108A, 108B of the other antenna array 104. Thereby, the magnitude of the signals radiated by the radiating elements 106A, 106B of the antenna array 102 after superposition is minimised at the at least part of the other radiating elements 108A, 108B, thus reducing the mutual coupling between the radiating elements 106A, 106B of the antenna array 102.

The signals radiated by the plurality of other radiating elements 108A, 108B of the other antenna array 104 are also radiated with a predetermined phase. The predetermined phases of the signals radiated by the other radiating elements 108A, 108B are in a range of 0 degrees to 360 degrees. In such implementation, the predetermined phase is typically from 0, 40, 80, 120, 160, 200, 240, 280 or 320 degrees up to 40, 80, 120, 160, 200, 240, 280, 320 or 360 degrees. The phase of the signal radiated by the other radiating elements 108A, 108B is determined such that the radiating element 106A, 106B is positioned/calibrated to cause the signals of the other radiating elements 108A, 108B to interfere destructively at at least part of the radiating elements 106A, 106B of the antenna array 102 after superposition, to reduce the mutual coupling between the radiating elements 106A, 106B of the antenna array 102. In an example, the signals radiated by the plurality of other radiating elements 108A, 108B have a difference of phase in between them. For instance, the difference of phase in between the signals by the first other radiating element 108A and the second other radiating element 108B of the other antenna array 104 is in a range of 0 degrees to 360 degrees. In such implementation, the difference of phase is typically from 0, 40, 80, 120, 160, 200, 240, 280 or 320 degrees up to 40, 80, 120, 160, 200, 240, 280, 320 or 360 degrees.

According to an embodiment, the antenna device 100 comprises a processor (not shown) configured to control the phase of the signal for each radiating element 106A, 106B. As discussed, the phase of the signal for each radiating element 106A, 106B of the antenna array 102 is controlled such that the signals radiated by the radiating elements 106A, 106B of the array 102 interfere destructively at at least part of the other radiating element 108A, 108B. The processor determines a suitable phase of the signal for each radiating element 106A, 106B of the antenna array 102 to cause the signal for each radiating element 106A, 106B to interfere destructively with other signals radiated by the radiating elements 106A, 106B of the antenna array 102 at the at least part of the other radiating elements 108A, 108B of the other antenna array 104. The processor achieves this by manipulating or exciting the radiating elements 106A, 106B of the antenna array 102 with a different phase and amplitude.

The processor is any analog device or digital device capable of controlling the radiating elements 106A, 106B in the antenna array 102. In the present examples, the processor relates to a computational element that is operable to respond to and processes instructions that determines the phase of the signal. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" refers to one or more individual processors, processing devices and various elements associated with a processing device that is shared by other processing devices. Additionally, the one or more individual processors, processing devices and processing elements are arranged in various architectures for responding to and for processing received instructions related to signal manipulation.

According to an embodiment, the other radiating element 108A, 108B is located on a broadside of the antenna array 102. As illustrated in FIG. 1A, the other radiating elements 108A, 108B of the other antenna array 104 are located adjacent to the radiating elements 106A, 106B of the antenna array 102 along a base axis B. Herein, the base axis B is perpendicular to the radiating direction A of the radiating elements 106A, 106B of the antenna array 102. Further, as discussed, the other radiating elements 108A, 108B are part of the other antenna array 104.

According to an embodiment, the antenna array 102 and the other antenna array 104 are arranged parallel to each other. As contemplated, such arrangement with the antenna array 102 and the other antenna array 104 being arranged parallel to each other, and the other radiating element 108A, 108B of the other antenna array 104 being located on the broadside of the antenna array 102 allows for destructive superposition of the signals radiated by the radiating elements 106A, 106B of the antenna array 102 at the at least part of the other radiating elements 108A, 108B.

According to an embodiment, a distance between the antenna array 102 and the other radiating element 108A, 108B is determined such that the signals radiated by the radiating elements 106A, 106B of the array 102 interfere destructively at the at least part of the other radiating element 108A, 108B. As illustrated in FIG. 1A, the antenna array 102 and the other antenna array 104 are spaced apart along the base axis B. The base axis B is a horizontal axis that is perpendicular to the radiating axis A of the antenna array 102 along which the antenna array 102 and the other antenna array 104 are arranged. As contemplated, the phase of the signal radiated by each of the plurality of radiating elements 106A, 106B of the antenna array 102 depends on the distance by which the waveform of the signal has travelled. The distance between the antenna array 102 and the other antenna array 104 is such determined that the signal radiated by each of the plurality of radiating elements 106A, 106B of the antenna array 102 is out of phase with each other to interfere destructively at the other radiating elements 108A, 108B. This ensures that the magnitude of the superposition of the signal radiated by each of the plurality of radiating elements 106A, 106B of the antenna array 102 is reduced to minimize mutual coupling between the radiating elements 106A, 106B.

In accordance with an embodiment, the other antenna array 104 is configured to radiate in a frequency range that at least partially overlaps with a frequency range of the antenna array 102. As discussed, the signal radiated by the other antenna array 104 is a radio frequency wave that is transmitted by the other radiating elements 108A, 108B therein. The signal radiated by each of the plurality of radiating elements 106A, 106B of the antenna array 102 is able to interfere destructively at the other radiating elements 108A, 108B of the other antenna array 104. This ensures that the magnitude of the superposition of the signal radiated by each of the plurality of radiating elements 106A, 106B of the antenna array 102 is reduced to minimize mutual coupling between the radiating elements 106A, 106B. For this purpose, at least a part of the frequency range of the signal radiated by the other radiating element 108A, 108B of the other antenna array 104 overlaps with the signal radiated by each of the plurality of radiating elements 106A, 106B of the antenna array 102 to allow for destructive interference at the at least part of the other radiating element 108A, 108B of the other antenna array 104.

In one or more examples, the plurality of other radiating elements 108A, 108B of the other antenna array 104 are directly fed from the same source as the radiating elements 106A, 106B of the antenna array 102 so that the signals radiated by the other radiating elements 108A, 108B of the other antenna array 104 have an overlapped frequency band with the signals radiated by the other radiating elements 108A, 108B of the antenna array 102. In an example, the frequency range of the antenna array 102 is 200 Megahertz to 250 Megahertz and the frequency range of the other antenna array 104 is 200 Megahertz to 300 Megahertz, resulting in an overlap of 50 Megahertz between 200 Megahertz to 250 Megahertz.

According to an embodiment, the plurality of radiating elements 106A, 106B are each configured to radiate the signal with a different amplitude, and wherein the amplitude of the signal for each radiating element 106A, 106B is determined such that a magnitude of a superposition of the signals is minimised at the at least part of the other radiating element 108A, 108B. Herein, with the amplitude of the signal radiated by the plurality of radiating elements 106A, 106B being different from each other, however being determined (i.e. known) helps to position/calibrate the other radiating elements 108A, 108B to cause destructive superposition of the signal for each radiating element 106A, 106B at the at least part of the other radiating elements 108A, 108B, resulting in minimised magnitude of the signal for each radiating element 106A, 106B after superposition (i.e. destructive interference), and thereby reducing coupling effect in the antenna array 102 of the antenna device 100.

According to an embodiment, the amplitude of the signal for each radiating element 106A, 106B includes a variation based on the frequency of the signal. That is, the amplitude of the signal radiated by the first radiating element 106A and the amplitude of the signal radiated by the second radiating element 106B varies based on the frequency variation in order to control the amplitude of the signals over frequency range so that there is a spectrum of signals with varying frequencies and amplitude, and thus there is an increased probability of destructive superposition at the at least part of the other radiating elements 108A, 108B, resulting in minimised magnitude of the signals after superposition (i.e. destructive interference), and thereby reducing the coupling effect in the antenna array 102 of the antenna device 100.

Figure 2A:
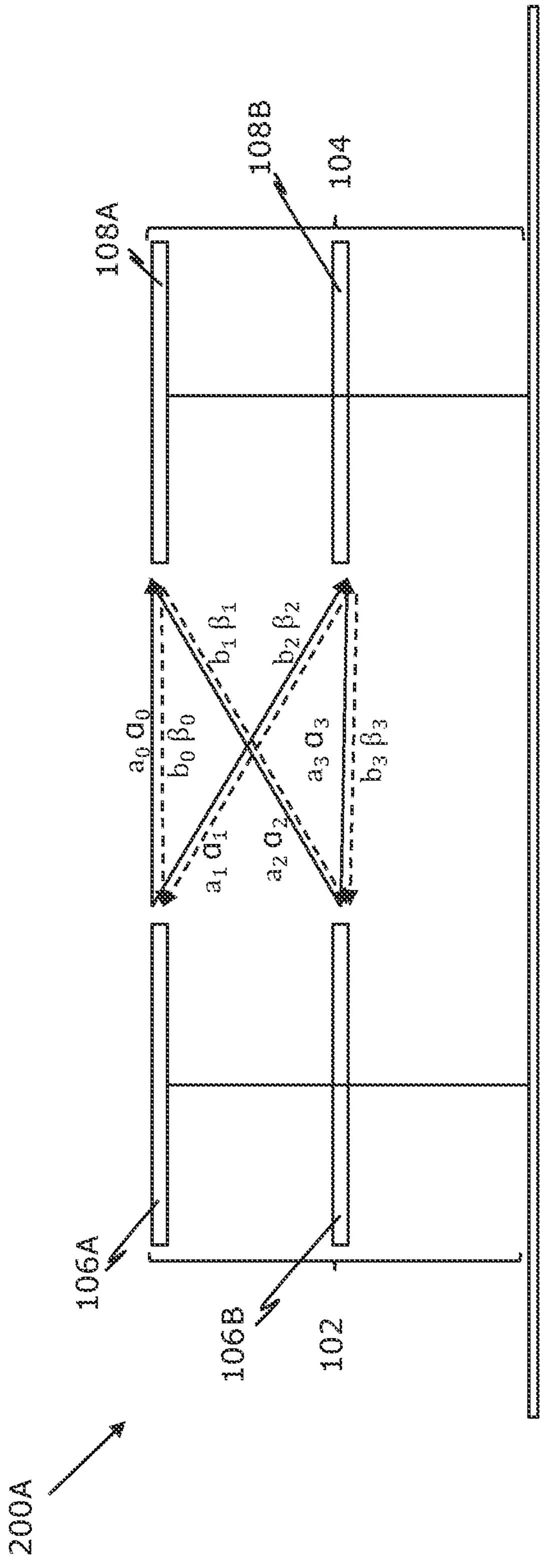
FIG. 2A is a schematic illustration of the antenna device, according to at least one embodiment.

FIG. 2A is a schematic illustration of an antenna device 200A, according to at least one embodiment. With reference to FIG. 2A, as shown, the antenna device 200A comprises the plurality of radiating elements 106A, 106B of the antenna array 102 and the other radiating elements 108A, 108B of the other antenna array 104. Herein, the signals radiated by the radiating elements 106A, 106B are referred to as "first signals" and the signals radiated by the other radiating elements 108A, 108B are referred to as "second signals". The amplitude and the phase of the first signal radiated by the first radiating element 106A with respect to the first other radiating element 108A are represented as $a_0$ and $\alpha_0$, respectively; and the amplitude and the phase of the signal radiated by the first radiating element 106A with respect to the second other radiating element 108B are represented as $a_1$ and $\alpha_1$, respectively. Further, the amplitude and the phase of the signal radiated by the second radiating element 106B with respect to the first other radiating element 108A are represented as $a_2$ and $\alpha_2$, respectively; and the amplitude and the phase of the signal radiated by the second radiating element 106B with respect to the second other radiating element 108B are represented as $a_3$ and $\alpha_3$, respectively. Furthermore, the amplitude and the phase of the second signal radiated by the first other radiating element 108A with respect to the first radiating element 106A are represented as $b_0$ and $\beta_0$, respectively; and the amplitude and the phase of the second signal radiated by the first other radiating element 108A with respect to the second radiating element 106B are represented as $b_1$ and $\beta_1$, respectively. Also, the amplitude and the phase of the second signal radiated by the second other radiating element 108B with respect to the first radiating element 106A are represented as $b_2$ and $\beta_2$, respectively; and the amplitude and the phase of the signal radiated by the second other radiating element 108B with respect to the second radiating element 106B are represented as $b_3$ and $\beta_3$, respectively.

According to at least one embodiment, the amplitude and the phase of the first signal for each radiating element 106A, 106B of the antenna array 102 is determined to position/calibrate the other radiating elements 108A, 108B of the other antenna array 104 such that the amplitude of the first signal radiated by the radiating elements 106A, 106B is minimized in superposition at the at least part of the other radiating elements 108A, 108B, and thereby reduce coupling effect between the radiating elements 106A, 106B in the antenna array 102 of the antenna device 200A. Cancellation of the signals in superposition at the location of the one other radiating elements 108A, 108B of the other antenna array 104 is represented as the following equations, $$y(a_1,\alpha_1)+y(a_3,\alpha_3)=0 \tag{1}$$

$$y(a_2,\alpha_2)+y(a_0,\alpha_0)=0 \tag{2}$$

Similarly, the amplitude and the phase of the second signal for each other radiating element 108A, 108B of the other antenna array 104 is determined to position/calibrate the radiating elements 106A, 106B of the antenna array 102 such that the amplitude of the second signal radiated by the other radiating elements 108A, 108B is minimized in superposition at the at least part of the radiating elements 106A, 106B. Cancellation of the signals in superposition at the location of the one other radiating elements 108A, 108B of the other antenna array 104 is represented as the following equations, $$z(b_0,\beta_0)+z(b_2,\beta_2)=0 \tag{3}$$

$$z(b_1,\beta_1)+z(b_3,\beta_3)=0 \tag{4}$$

Figure 2B:
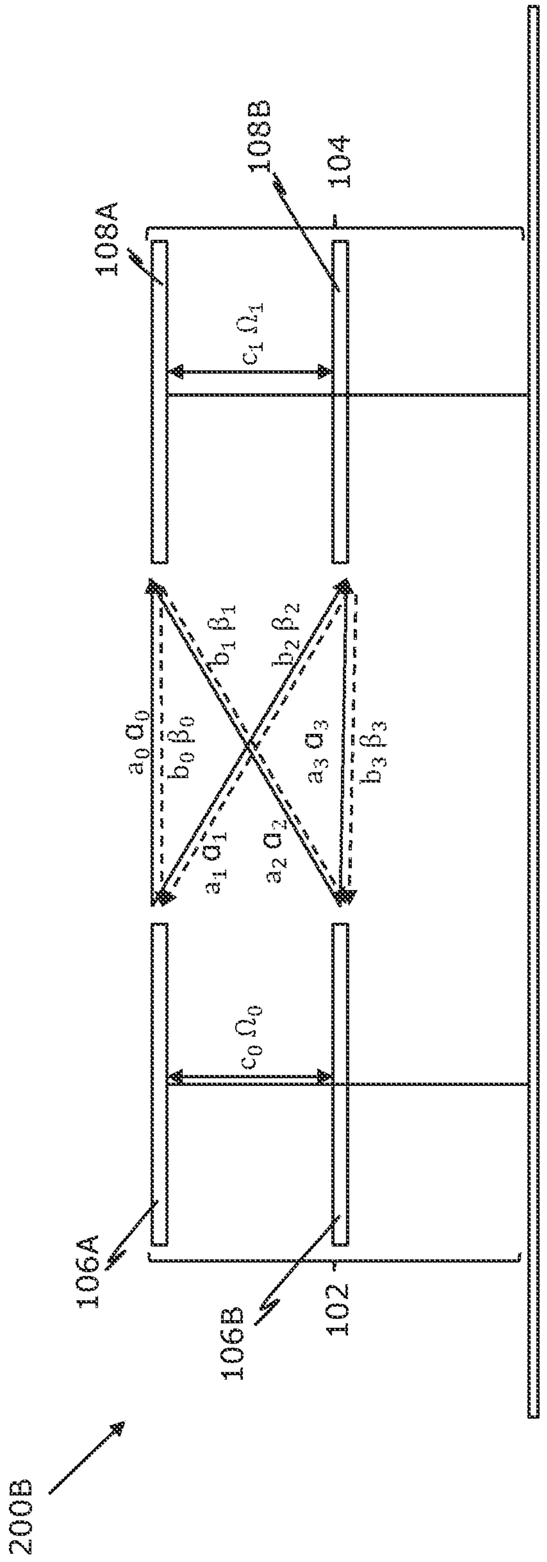
FIG. 2B is a schematic illustration of the antenna device, according to at least one embodiment.

The above approach as described in reference to FIG. 2B provides for direct cancellation of mutual coupling between the radiating elements 106A, 106B in the antenna array 102 of the antenna device 200A over air. Herein, the cancellation is achieved due to the superposition of electromagnetic fields of the signals in the antenna device 200A.

FIG. 2B is a schematic illustration of an antenna device 200B, according to at least one embodiment. With reference to FIG. 2B, as shown, the antenna device 200B comprises the plurality of radiating elements 106A, 106B of the antenna array 102 and the other radiating elements 108A, 108B of the other antenna array 104. Herein, the signals radiated by the radiating elements 106A, 106B are referred to as "first signals" and the signals radiated by the other radiating elements 108A, 108B are referred to as "second signals". The amplitude and the phase of the first signal radiated by the first radiating element 106A with respect to the first other radiating element 108A are represented as $a_0$ and $\alpha_0$, respectively; and the amplitude and the phase of the signal radiated by the first radiating element 106A with respect to the second other radiating element 108B are represented as $a_1$ and $\alpha_1$, respectively. Further, the amplitude and the phase of the signal radiated by the second radiating element 106B with respect to the first other radiating element 108A are represented as $a_2$ and $\alpha_2$, respectively; and the amplitude and the phase of the signal radiated by the second radiating element 106B with respect to the second other radiating element 108B are represented as $a_3$ and $\alpha_3$, respectively. Furthermore, the amplitude and the phase of the second signal radiated by the first other radiating element 108A with respect to the first radiating element 106A are represented as $b_0$ and $\beta_0$, respectively; and the amplitude and the phase of the second signal radiated by the first other radiating element 108A with respect to the second radiating element 106B are represented as $b_1$ and $\beta_1$, respectively. Also, the amplitude and the phase of the second signal radiated by the second other radiating element 108B with respect to the first radiating element 106A are represented as $b_2$ and $\beta_2$, respectively; and the amplitude and the phase of the signal radiated by the second other radiating element 108B with respect to the second radiating element 106B are represented as $b_3$ and $\beta_3$, respectively. Further, the amplitude and the phase of signal radiated between the plurality of radiating elements 106A, 106B of the antenna array 102 are represented as $c_0$ and $\Omega_0$, respectively; and the amplitude and the phase of signal radiated between the other radiating elements 108A, 108B of the other antenna array 104 are represented as $c_1$ and $\Omega_1$, respectively.

According to an embodiment, the phase of the signal for each radiating element 106A, 106B is controlled such that the signals radiated by the radiating elements 106A, 106B of the array 102 interfere destructively at an input port of the other radiating element 108A, 108B. Cancellation of the signals in superposition at the input port of the other antenna array 104 is represented by the following equation, $$y(a_2,\alpha_2)+y(a_0,\alpha_0)\Delta x(c_1,\Omega_1)+y(a_1,\alpha_1)+y(a_3,\alpha_3)=0 \tag{5}$$

Furthermore, in an example, the phase of the signal for each other radiating element 108A, 108B is controlled such that the signals radiated by the other radiating element 108A, 108B. interfere destructively at an input port of the radiating elements 106A, 106B of the array 102. Cancellation of the signals in superposition at the input port of the antenna array 102 is represented by the following equation, $$z(b_0,\beta_0)+z(b_2,\beta_2)\Delta x(c_0,\Omega_0)+z(b_1,\beta_1)+z(b_3,\beta_3)=0 \tag{6}$$

The above approach as described in reference to FIG. 2B provides for cancelling of coupling between the radiating elements 106A, 106B of the antenna array 102 at the input port of the other radiating elements 108A, 108B, i.e. the other antenna array 104. This approach also accounts for structure of the radiating elements 106A, 106B and the other radiating elements 108A, 108B.

Figure 2C:
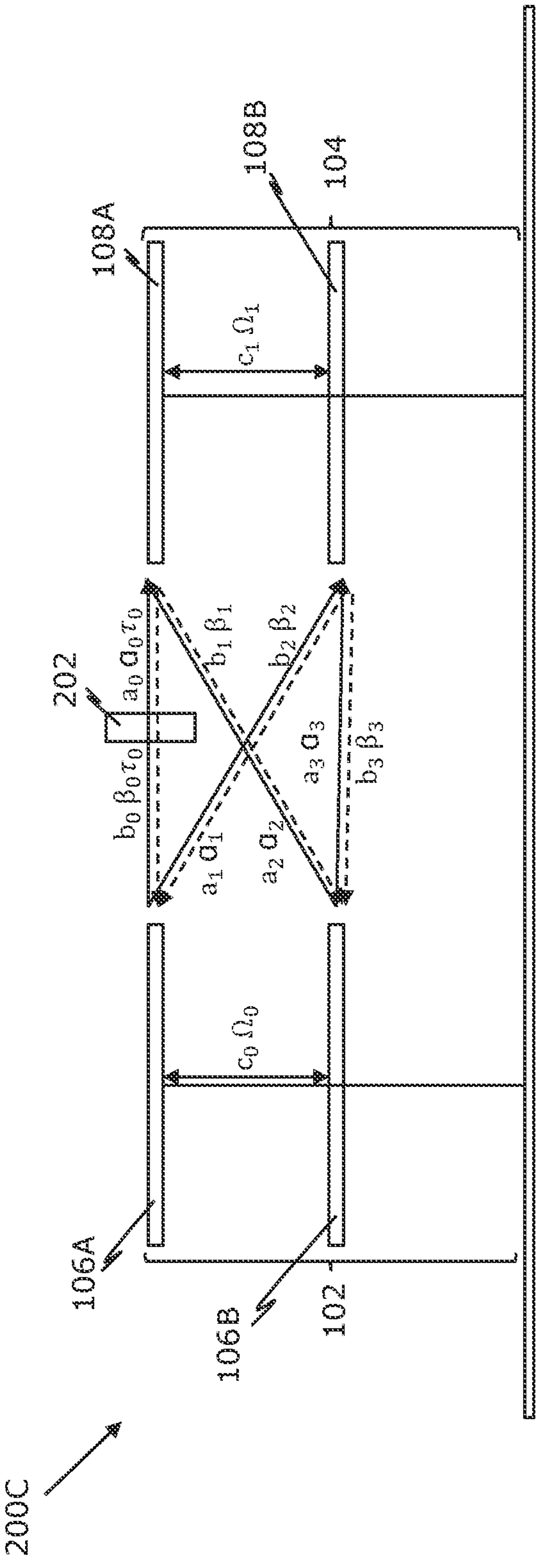
FIG. 2C is a schematic illustration of the antenna device with a phase change element, according to at least one embodiment.

FIG. 2C is a schematic illustration of an antenna device 200C, according to at least one embodiment. With reference to FIG. 2C, as shown, the antenna device 200C comprises the plurality of radiating elements 106A, 106B of the antenna array 102 and the other radiating elements 108A, 108B of the other antenna array 104. Herein, the signals radiated by the radiating elements 106A, 106B are referred to as "first signals" and the signals radiated by the other radiating elements 108A, 108B are referred to as "second signals". The amplitude and the phase of the first signal radiated by the first radiating element 106A with respect to the first other radiating element 108A are represented as $a_0$ and $\alpha_0$, respectively; and the amplitude and the phase of the signal radiated by the first radiating element 106A with respect to the second other radiating element 108B are represented as $a_1$ and $\alpha_1$, respectively. Further, the amplitude and the phase of the signal radiated by the second radiating element 106B with respect to the first other radiating element 108A are represented as $a_2$ and $\alpha_2$, respectively; and the amplitude and the phase of the signal radiated by the second radiating element 106B with respect to the second other radiating element 108B are represented as $a_3$ and $\alpha_3$, respectively. Furthermore, the amplitude and the phase of the second signal radiated by the first other radiating element 108A with respect to the first radiating element 106A are represented as $b_0$ and $\beta_0$, respectively; and the amplitude and the phase of the second signal radiated by the first other radiating element 108A with respect to the second radiating element 106B are represented as $b_1$ and $\beta_1$, respectively. Also, the amplitude and the phase of the second signal radiated by the second other radiating element 108B with respect to the first radiating element 106A are represented as $b_2$ and $\beta_2$, respectively; and the amplitude and the phase of the signal radiated by the second other radiating element 108B with respect to the second radiating element 106B are represented as $b_3$ and $\beta_3$, respectively.

As illustrated in FIG. 2C, the antenna device 200C further comprises a phase change element 202. According to an embodiment, a phase change element 202 is arranged between one or more of the radiating elements 106A, 106B and the other radiating element 108A, 108B, wherein, in response to the signal radiated by one or more of the radiating elements 106A, 106B passing through the phase change element 202, the phase change element 202 is configured to introduce a phase adjustment into the signal, and wherein the phase adjustment of the phase change element 202 is determined such that the signals radiated by the radiating elements 106A, 106B of the array 102 interfere destructively at the at least part of the other radiating element 108. The phase change element 202 is a media placed in the path of propagation of the signal between the antenna array 102 and the other antenna array 104 to change the phase of the signal in response to the signal passing through the phase change element 202 without causing distortion and loss of the signal. For example, the phase change element 202 is placed between the antenna array 102 and the other antenna array 104 to alter the phase $\alpha_0$ of the first signal radiated by the first radiating element 106A. In the present examples, the phase change element 202 is formed from any suitable material, for example, a dielectric material or metamaterial. The phase adjustment of the phase change element 202 is determined such that the signal radiated by the at least one of the radiating elements 106A, 106B undergoes destructive interference with the signal radiated by the other of the radiating elements 106A, 106B that results in minimized amplitude of the signal at the other radiating elements 108A, 108B of the other antenna array 104. In the illustration of FIG. 2C, the phase adjustment provided by the phase change element 202 is represented as $\tau_0$. Cancellation of the signals using the phase change element 202 at the other antenna array 104 is represented by the following equation, $$y(a_2,\alpha_2)+y(a_0,\alpha_0,\tau_0)\Delta x(c_1,\Omega_1)+y(a_1,\alpha_1)+y(a_3,\alpha_3)=0 \quad (7)$$

Further, cancellation of the second signal using the phase change element 202 at the at least part of the plurality of radiating elements 106A, 106B of the antenna array 102 is represented by the following equation, $$z(b_0,\beta_0,\tau_0)+z(b_2,\beta_2)\Delta x(c_0,\Omega_0)+z(b_1,\beta_1)+z(b_3,\beta_3)=0 \quad (8)$$

Figure 3B:
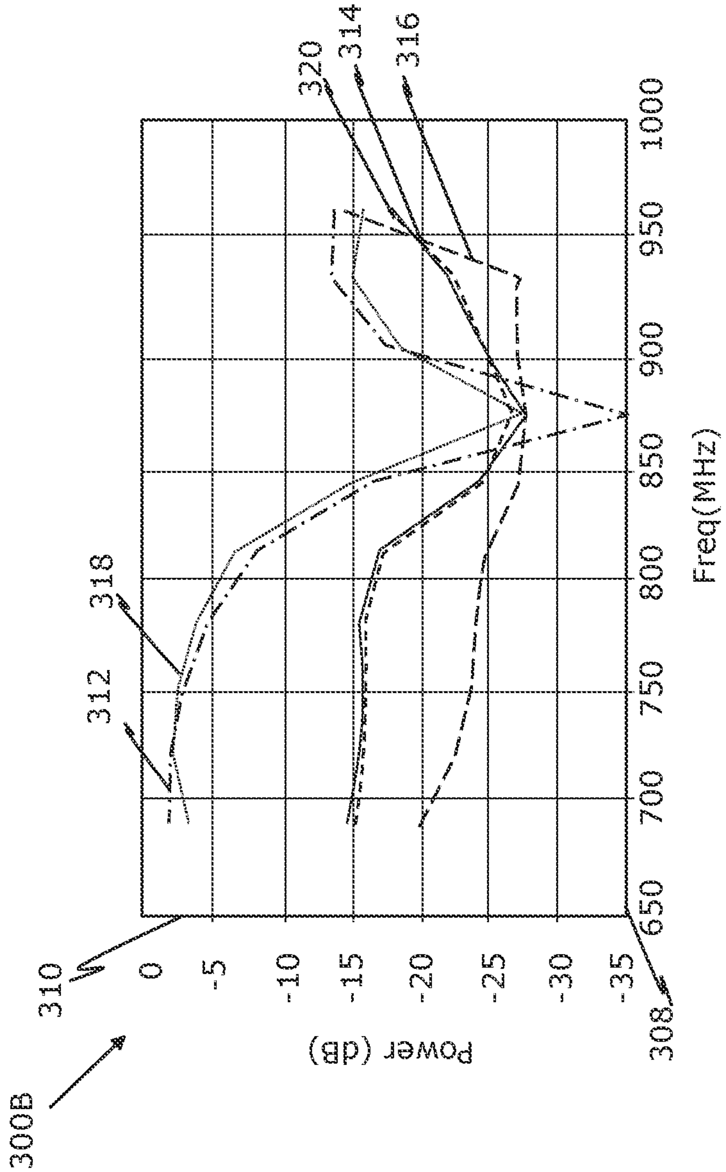
FIG. 3B is a graphical representation depicting a scattering parameter of the antenna device of FIG. 3A, according to at least one embodiment.
Figure 3A:
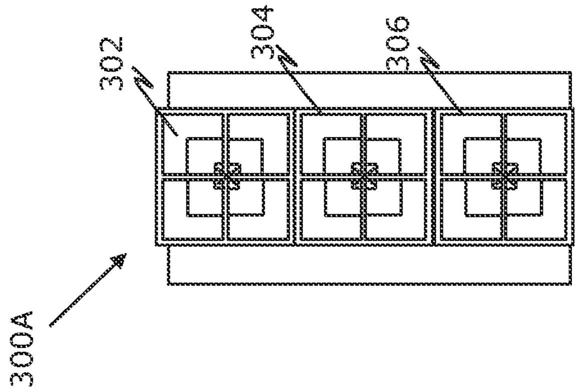
FIG. 3A is a diagrammatic illustration of an antenna device, according to at least one embodiment.

FIG. 3A is a diagrammatic illustration of an antenna device 300A, according to at least one embodiment. As illustrated in FIG. 3A, the antenna device 300A comprises a first antenna structure 302, a second antenna structure 304 and a third antenna structure 306. Each of the first antenna structure 302, the second antenna structure 304 and the third antenna structure 306 comprises multiple ports.

FIG. 3B is a graphical representation that depicts an exemplary scattering parameter 300B of the antenna device 300A of FIG. 3A, according to at least one embodiment. The scattering parameter 300B provides the input-output relationship between ports in the antenna device 300A. The scattering parameter 300B shows reflection and transmission characteristics of amplitude and optionally phase of the signal in the frequency domain. Herein, the power (dB) of the scattering parameter 300B is shown on Y-axis 310 at each frequency (in Megahertz) on the X-axis 308.

In the scattering parameter 300B, a first line 312 represents the return loss ($S_{ii}$) of a first port which operates best at about 870 Megahertz with power at about −35 dB. Further, a second line 318 represents the return loss ($S_{ii}$) of a port which operates best at about 870 Megahertz with power at about −27.5 dB. Also, a third line 314 represents the coupling ($S_{ij}$) of a port which operates best at about 870 Megahertz with power at about −27.5 dB. Similarly, a fourth line 316 represents the coupling ($S_{ij}$) of a port which operates best at about 840 Megahertz with power at about −27.5 dB. Also, a fifth line 318 represents the coupling ($S_{ij}$) of a port which operates best at about 840 Megahertz with power at about −27.5 dB. The graphical representation shows how each element is tuned and isolated from adjacent elements even with a very small distance between them.

Figure 4:
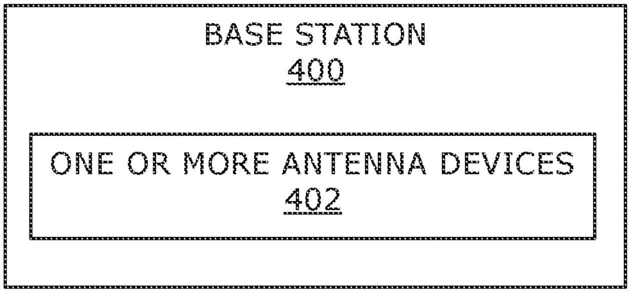
FIG. 4 is a block diagram of a base station with one or more antenna devices, according to at least one embodiment.

FIG. 4 is a block diagram of a base station with one or more antenna devices, according to at least one embodiment. FIG. 4 is described in conjunction with elements from FIGS. 1A and 10, 2A to 2C, and 3A and 3B. With reference to FIG. 4, there is shown a base station 400 that comprises one or more antenna devices 402, such as the antenna device 100, 200A, 200B, 200C, or 300. The base station 400 include suitable logic, circuitry, and/or interfaces that is configured to communicate with a plurality of wireless communication devices over a cellular network (e.g. 2G, 3G, 4G, or 5G) via the one or more antenna devices 402, such as the antenna device 100, 200A, 200B, 200C, or 300. Examples of the base station 400 include, but are not limited to, an evolved Node B (eNB), a Next Generation Node B (gNB), and the like. In an example, the base station 400 includes an array of antenna devices that function as an antenna system to communicate with the plurality of wireless communication devices in an uplink and a downlink communication. Examples of the plurality of wireless communication devices include, but are not limited to, a user equipment (e.g. a smartphone), a customer premise equipment, a repeater device, a fixed wireless access node, or other communication devices or telecommunications hardware.

The antenna device of at least one embodiment has a plurality of radiating elements that radiate signals with predetermined different phases and amplitudes that result in destructive interference, which in turn results in reduced coupling between adjacent antenna arrays without degrading the individual performance of each antenna array. The phase and amplitude are determined directly based on propagation of the signal, distances between the antenna array and the other antenna array and source excitations of the plurality of radiating elements. Thus, the proposed antenna device reduces coupling without increasing the size of the antenna device, which facilitates certain activities related to telecommunication services, such as site acquisition, local regulations regarding site upgrades and/or reuse of current mechanical support structures at the installation sites.

The antenna device of at least one embodiment ensures decoupling of two closely spaced end fire antenna elements. This is achieved by having two sources of the same signal with a phase difference, such that the fields are added destructively on the adjacent antenna array, therefore, reducing the coupling between them. Each of the collocated antennas work at the same frequency and are fed independently, which allows a phase selection that would cancel the coupling on an adjacent equivalent element. In the antenna systems, as electromagnetic (EM) fields propagate, constructive and destructive superposition are generated. The present antenna device provides a novel approach to increase the isolation between closely spaced antenna arrays. The antenna device generates destructive superposition of the EM fields on the side by side elements of the array by profiting from the multipath environment generated in response to using a radiating element with more than one collocated source of signal and another radiating element. The achieved isolation improvement is used to miniaturize the width of an antenna device with several independent antenna arrays. Since the changes in design of antenna device are based on propagation rather than circuitry, the resulting design is broadband enough to support current bands in base stations.

Although at least one embodiment has been described with reference to specific features and embodiments thereof, various modifications and combinations are able to be made thereto without departing from the spirit and scope of at least one embodiment. The specification and drawings are, accordingly, to be regarded simply as an illustration of at least one embodiment as defined by the appended claims, and are contemplated to cover any and all modifications, variations, combinations or equivalents that fall within the scope of at least one embodiment.

Modifications to embodiments described in the foregoing are possible without departing from the scope of embodiments as defined by the accompanying claims. Expressions such as “including”, “comprising”, “incorporating”, “have”, “is” used to describe and claim at least one embodiment are intended to be construed in a non-exclusive manner, namely allowing for items, components or elements not explicitly described also to be present.

Reference to the singular is also to be construed to relate to the plural. The word “exemplary” is used herein to mean “serving as an example, instance or illustration”. An embodiment described as “exemplary” is not necessarily to be construed as preferred or advantageous over other embodiments and/or to exclude the incorporation of features from other embodiments. The word “optionally” is used herein to mean “is provided in some embodiments and not provided in other embodiments”. Certain features of at least one embodiment, which are, for clarity, described in the context of separate embodiments, are also provided in combination in a single embodiment. Conversely, various features of at least one embodiment, which are, for brevity, described in the context of a single embodiment, are also provided separately or in any suitable combination or as suitable in any other described embodiment of the disclosure.

The invention claimed is:

1. An antenna device comprising:
- an antenna array for transmitting a signal, the antenna array comprising: a plurality of radiating elements each configured to radiate the signal with a predetermined phase;
- another radiating element of another antenna array that is not part of the antenna array, the another antenna array is located along a base axis that is perpendicular to a radiating direction of the another radiating element to allow for destructive superposition of the signals radiated by the plurality of radiating elements of the antenna array at the at least part of the another radiating element of the another antenna array,
- wherein the phase of the signal for each radiating element of the antenna array is controlled to cause the signals radiated by the radiating elements of the array to interfere destructively with other signals radiated at at least part of the another radiating element of the another antenna array.

2. The antenna device of claim 1, wherein the antenna array is an end fire array.

3. The antenna device of claim 1, wherein the another radiating element is located adjacent to the antenna array.

4. The antenna device of claim 1, wherein the plurality of radiating elements are each configured to radiate the signal with a different amplitude, and
- wherein the amplitude of the signal for each radiating element is determined such that a magnitude of a superposition of the signals is minimised at the at least part of the another radiating element.

5. The antenna device of claim 4, wherein the amplitude of the signal for each radiating element includes a variation based on the frequency of the signal.

6. The antenna device of claim 1, wherein the phase of the signal for each radiating element is controlled such that the signals radiated by the radiating elements of the array interfere destructively at an input port of the another radiating element.

7. The antenna device of claim 1, wherein a distance between the antenna array and the another radiating element is determined such that the signals radiated by the radiating elements of the array interfere destructively at the at least part of the another radiating element.

8. The antenna device of claim 1, wherein the plurality of radiating elements are spaced apart along an axis that is parallel to a radiating direction of the antenna array.

9. The antenna device of claim 1, the another antenna array including a plurality of radiating elements, the plurality of radiating elements of the another antenna array including said another radiating element.

10. The antenna device of claim 9, wherein the signals radiated by the radiating elements of the antenna array interfere destructively at at least part of each radiating element of the another antenna array.

11. The antenna device of claim 9, wherein the antenna array and the another antenna array are arranged parallel to each other.

12. The antenna device of claim 9, wherein the another antenna array is configured to radiate in a frequency range that at least partially overlaps with a frequency range of the antenna array.

13. The antenna device of claim 1, further comprising a phase change element arranged between one or more of the radiating elements and the another radiating element,
- wherein, in response to the signal radiated by one or more of the radiating elements passing through the phase change element, the phase change element is configured to introduce a phase adjustment into the signal, and
- wherein the phase adjustment of the phase change element is determined such that the signals radiated by the radiating elements of the array interfere destructively at the at least part of the another radiating element.

14. The antenna device of claim 1, further comprising a processor configured to control the phase of the signal for each radiating element.

15. A base station comprising:
- one or more antenna devices, wherein each of the antenna device includes:
- an antenna array for transmitting a signal, the antenna array including: a plurality of radiating elements each configured to radiate the signal with a predetermined phase;
- the antenna device further including another radiating element of another antenna array that is not part of the antenna array, the another antenna array is located along a base axis that is perpendicular to a radiating direction of the another radiating element to allow for destructive superposition of the signals radiated by the plurality of radiating elements of the antenna array at the at least part of the another radiating element of the another antenna array, wherein the phase of the signal for each radiating element of the antenna array is controlled to cause the signals radiated by the radiating elements of the array to interfere destructively with other signals radiated at at least part of the another radiating element of the another antenna array.

16. The base station of claim 15, wherein the antenna array is an end fire array.

17. The base station of claim 15, wherein the another radiating element is located adjacent to the antenna array.

18. The base station of claim 15, wherein the plurality of radiating elements are each configured to radiate the signal with a different amplitude, and wherein the amplitude of the signal for each radiating element is determined such that a magnitude of a superposition of the signals is minimised at the at least part of the another radiating element.

19. The base station of claim 18, wherein the amplitude of the signal for each radiating element includes a variation based on the frequency of the signal.

20. The base station of claim 15, wherein the phase of the signal for each radiating element is controlled such that the signals radiated by the radiating elements of the array interfere destructively at an input port of the another radiating element.

* * * * *